Jan. 5, 1971      L. URMENYI      3,553,668
METHOD OF AND DEVICE FOR DETECTING SURFACE ELEVATIONS
Filed May 2, 1966      3 Sheets-Sheet 1
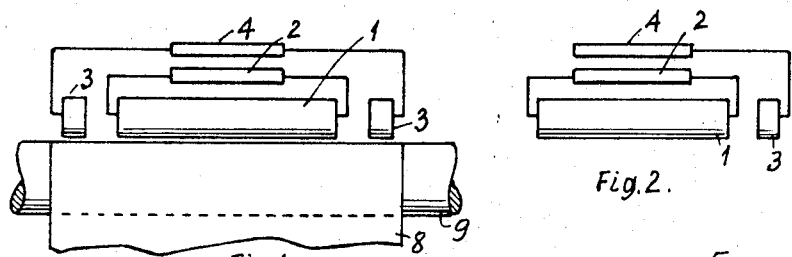
Fig. 1.
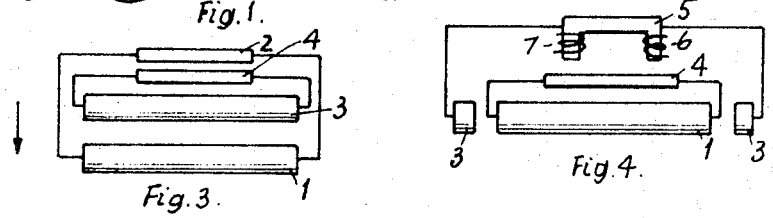
Fig. 2.
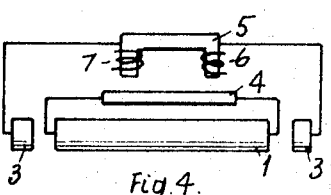
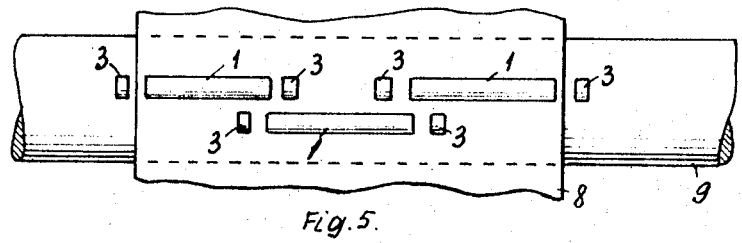
Fig. 3.    Fig. 4.
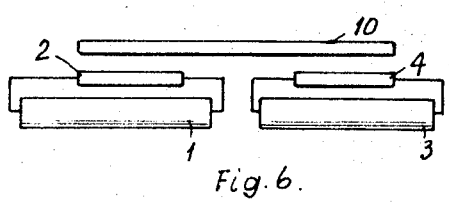
Fig. 5.
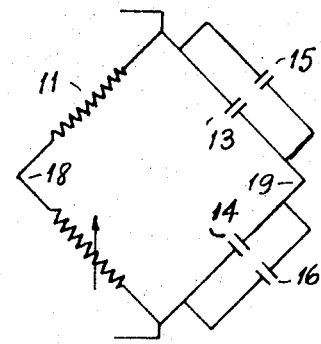
Fig. 6.
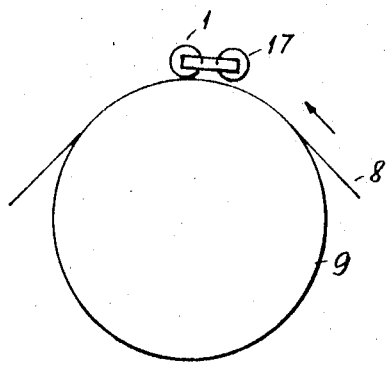
Fig. 7.
Fig. 8.

Jan. 5, 1971     L. URMENYI     3,553,668
METHOD OF AND DEVICE FOR DETECTING SURFACE ELEVATIONS
Filed May 2, 1966     3 Sheets-Sheet 2

3,553,668
METHOD OF AND DEVICE FOR DETECTING SURFACE ELEVATIONS
Laszlo Urmenyi, 18 Ernie Road, Wimbledon, London, SW. 20, England
Filed May 2, 1966, Ser. No. 547,142
Claims priority, application Great Britain, May 24, 1965, 21,897/65; July 15, 1965, 30,089/65, 30,090/65
Int. Cl. G08b *21/00*
U.S. Cl. 340—259      14 Claims

ABSTRACT OF THE DISCLOSURE

Method and apparatus are disclosed for the detection of irregularities of small area in the thickness of a moving web. Electrical means are used to detect differential movement between two feeler means—a first of which is in constant contact with the surface of the web, and a second of which is supported by the first at some small distance from the web and is contacted only by localized surface irregularities to thereby produce differential feeler movement. The electrical means are disclosed as capacitive, inductive, and switch operated.

---

The object of this invention is to provide a method of and device for detecting surface elevations like lumps, wrinkles, creases, etc., in paper and other sheet material. According to the invention, the sheet material is made to pass over a supporting surface, at least one feeler member is mounted near the area in which the sheet material is in contact with the supporting surface, at least one contact member which is mounted in a movable manner is in contact with the surface of the sheet material and electrical means are used to give a signal when a surface elevation in the sheet material is urging the feeler member to move relative to the sheet material. It will be appreciated that urging to move does not imply actual movement. In fact, a surface elevation may be too limp to move the feeler member relative to the sheet material. Also according to the invention the sheet material is made to pass over a supporting surface, at least one feeler member is mounted near the area in which the sheet material is in contact with the supporting surface, at least one contact member is adapted to contact the surface of the sheet material near the feeler member, at least one datum member is controlled by the contact member in such a way that the distance between the surface of the sheet material and the datum member is kept constant unaffected by variations in the position of the supporting surface and in the thickness of the sheet material, electrical means being provided to produce an electrical signal when a surface elevation is in contact with the feeler member. Said electrical means may comprise a reactive or resistive circuit element which may form part of a bridge circuit.

A further object of the invention is to provide adjustable means to prohibit any change in a predetermined direction in the relative position of the feeler member and the datum member but allow such change in the opposite direction. Said means may be adjusted in two different ways. It may be adjusted so that the feeler member is in contact with the sheet material and when a surface elevation moves the feeler member away from the surface of the sheet material, the distance between feeler member and datum member changes and a signal is obtained but when the contact member is moved away from the surface of the sheet material by a surface elevation, then the contact member moves the feeler member by the same amount in the same direction thus prohibiting a change in relative position between feeler member and datum member and no signal is obtained. Alternatively said adjustable means may be adjusted so that the feeler member is located at a small distance, say 0.0005" from the surface of the sheet material, thus direct contact with the sheet material is avoided. The contact member is in contact with the sheet material and keeps the distance constant between the surface of the sheet material and the feeler member unaffected by possible eccentric running of a supporting roll or changes in the thickness of the sheet material. A local surface elevation in excess of 0.0005" will touch the feeler member and may move it relative to the datum member thus producing an electrical signal. This latter method is of advantage in case of certain types of coated paper, when direct contact with the paper is undesirable. The contact member having no no part in the detection of surface elevations and assuming it is a rotary type may exert sufficient pressure on the sheet material to ensure that it is safely rotated by the sheet material without slipping and therefore direct contact by a rotating contact member is not objectionable.

When the feeler member is adjusted in the way just described, namely kept at a small constant distance from the surface of the sheet material without touching it, then in cases when the sheet material is a poor electrical insulator, e.g., paper, the feeler member may be electrically insulated from its mounting and when a surface elevation is passing under the feeler member, a direct contact of the surface elevation with the feeler member reduces the electrical resistance between feeler member and ground due to the resistance of the paper. This resistance may be of the order of a few megohms to a few hundred megohms and if the feeler member is highly insulated the resistance change is significant and may be utilised to provide an electrical signal. In this latter case it is not necessary to move the feeler member to obtain a signal. The two ways of obtaining a signal, namely producing a resistance change by contacting the feeler member with the surface elevation and alternatively by arranging for the feeler member to be moved by the surface elevation may be combined in one probe. This combination of the two methods may be of advantage in cases when gentle creases which are not able to move the feeler member must be detected on the one hand and inclusions of small lumps of insulating material which would not give a signal by simple contact due to their high insulation resistance but are sufficiently rigid to move the feeler member are likely to occur and must be detected on the other hand. If such inclusions of insulating matter are not expected, the method of resistance change on gentle contact may be used exclusively.

A further object of the invention is to differentiate between lumps and creases and to provide means to set the sensitivity of the device separately for lumps and separately for creases. The reason for this arrangement is that frequently a small lump is more acceptable than a long thin crease of equal elevation. For example a lump which is less than .004" high may be acceptable but a crease which is higher than .001" must be detected and the paper containing it must be rejected. Such creases may be several feet long and occasionally may reach 50 feet or more in length. According to one example of the invention the signal produced by the feeler member is amplified and rectified giving one or two direct voltage outputs. In case of a lump the output is a direct voltage pulse of short duration. In case of a crease the direct voltage pulse may be of several seconds duration. One DC output is utilised to provide an instantaneous signal, an attenuator, which may be a variable potentiometer, being provided for sensitivity control for lumps, and one DC output is passed through two RC or other time delay circuits of which one is of short duration, e.g., less than one second, and the other one of long duration, e.g., several seconds, the latter RC circuit being also provided with switching means to shorten its time constant, said switching means becoming inoperative when the output of the time delay circuit of long duration is different in one predetermined direction (e.g., more positive) from the output of the time delay circuit of short duration, further means being provided to produce a continuous DC or AC signal, which may be the output of a pulse generator, whilst the output of the time delay circuit of long duration is different in one predetermined direction (e.g., more positive) from the output of the time delay circuit of short duration.

Thus a lump produces a single DC pulse signal and a crease produces a continuous output which may be the output from a pulse generator, the duration of the latter signal being equal to the duration of the crease but limited by the time constant of the said RC circuit of long duration.

The signals may be utilised in different ways. They may provide an alarm signal or may be used to mark the edge of the paper in line with the fault or the paper may be inspected on a rotary cutter (sheeter) provided with a gate. In the later case the inspection takes place in front of the cutter (i.e., before the paper is cut) and the fault signals are fed into a computer which provides the time delay for the faulty sheet to travel from the point of inspection to the gate and operates the gate at the right moment to reject the faulty sheet.

The invention will now be more fully described by the way of examples with reference to the following drawings:

FIG. 1 is a diagrammatic representation of an example of one feeler member and two contact members using capacitance as reactive circuit element.

FIG. 2 is a diagrammatic representation of an example of one feeler member and one contact member using capacitance as reactive circuit element.

FIG. 3 is a diagrammatic representation of another example of one feeler member and one contact member using capacitance as reactive circuit element.

FIG. 4 is a diagrammatic representation of an example of one feeler member and two contact members using inductance as reactive circuit element.

FIG. 5 is a diagram showing an example of staggered relative position of feeler members.

FIG. 6 is a diagrammatic representation of an example of feeler members using two capacitances.

FIG. 7 is a circuit diagram showing application of the example of FIG. 6 to a bridge circuit.

FIG. 8 shows a feeler member comprising also a non-contacting member for detecting splices.

Figure 9:
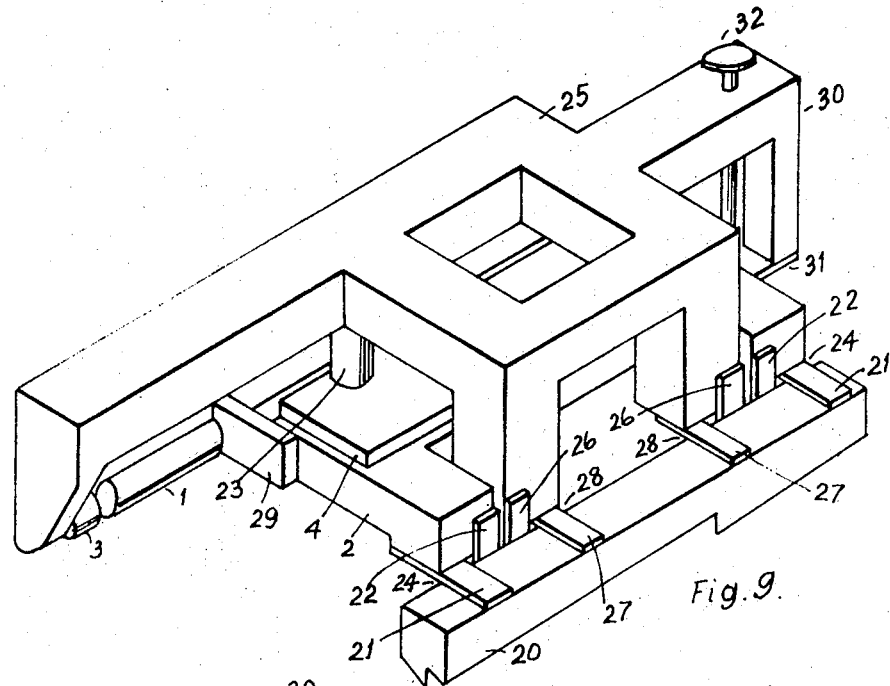
FIG. 9 is an example of a probe design containing a stationary bar as feeler member.

Referring now to FIG. 1, 1 is a feeler member which may be a stationary rod or strip or a rotating roll contacting the sheet material 8 over a supporting surface 9, which is a roll in this example, 2 is a capacitor plate mounted on part 1, 3 is a contact member consisting in this example of two parts connected to each other and to 4 which is a datum member, in this case a capacitor plate. 3 may be stationary or rotating. 1 and 3 are mounted on pivoted arms, not shown, preferably pivoted at points lying in a straight line parallel to the line in which 1 and 3 are contacting the sheet material. If the supporting surface is a roll and runs eccentric or the thickness of the sheet material changes, 1 and 3 are lifted and lowered simultaneously by the same amount, and the distance and therefore the capacitance between 2 and 4 does not change. If a lump or crease or other local surface elevation passes under 1, then only 1 is lifted, the distance between 2 and 4 decreases and the capacitance between them increases.

In FIG. 2, 1, 2, 3 and 4 denote the same parts as in FIG. 1. Here contact member 3 consists of one part only.

In FIG. 3, identical numbers denote identical parts as in the previous figures. Parts 1 and 3 are shown in plan view whilst parts 2 and 4 are in elevation. The arrow indicates the direction in which the sheet material is moving. A surface elevation or a splice lifts feeler member 3 first thereby increasing the capacitance between 2 and 4 momentarily. A long crease in the direction of the movement of the sheet material causes a capacitance change only whilst the beginning of the crease passes under 3; therefore this arrangement is not suitable for the detection of long creases.

In FIG. 4, 1 is a feeler member, 3 are contact members, 4 is a member made of magnetic material, 5 is a U-shaped magnetic core carrying coils 6 and 7. When the distance between members 4 and 5 is decreased, the self inductance of coils 6 and 7 or the mutual inductance between coils 6 and 7 is increased.

FIG. 5 shows an example of staggered relative position of feeler members and contact members. It can be seen that feeler members 1 are overlapping.

Figure 14:
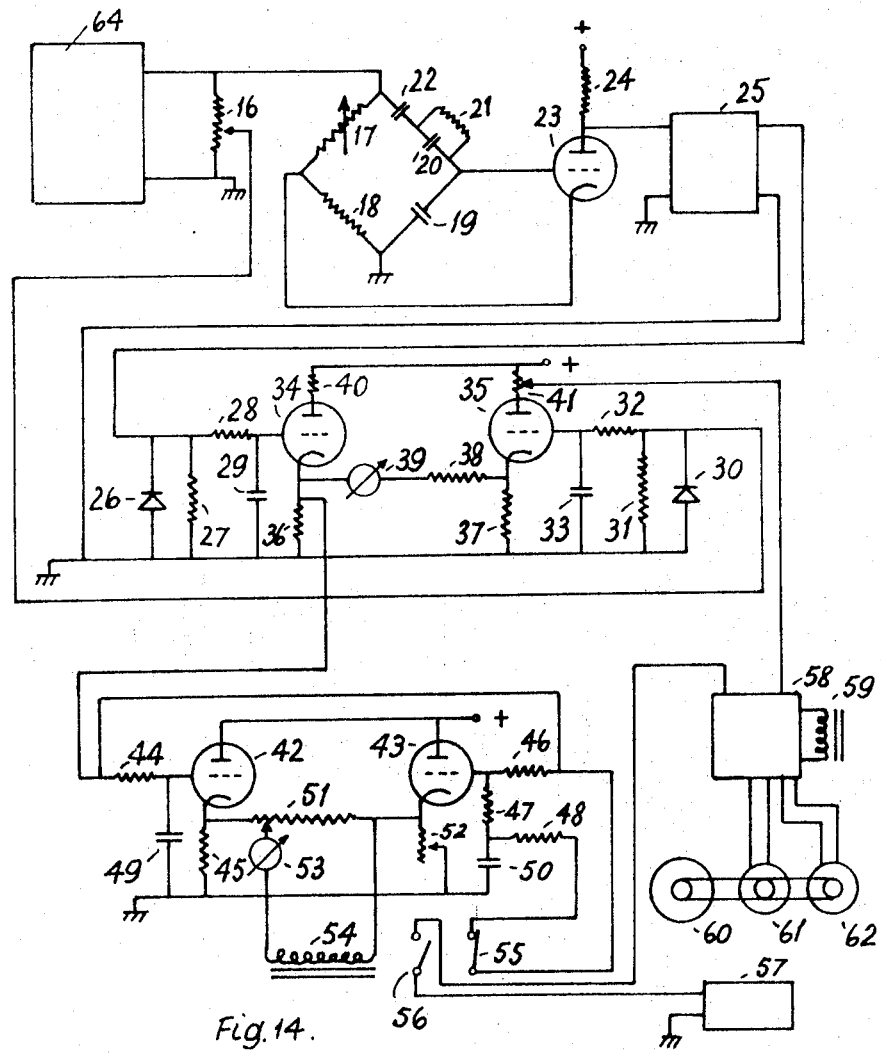
FIG. 14 is an example of a circuit diagram.

In FIG. 6, 1 is a feeler member carrying capacitor plate 2, 3 is another feeler member carrying capacitor plate 4, 10 is a capacitor plate in a fixed position opposite plates 2 and 4, or alternatively 10 may be supported by a contact member not shown, the capacitance between plates 2 and 10 being equal to the capacitance between 4 and 10. The operation of this example is best described with reference to FIG. 7 which shows a bridge circuit in which 11 and 12 are resistors, 13 represents the capacitance between plates 2 and 10 of FIG. 6 and 14 represents the capacitance between plates 4 and 10 of FIG. 6. 15 and 16 represent capacitances of another probe which may be connected in parallel to 13 and 14 if required. If feeler members 1 and 3 are lifted by equal amounts, capacitances 13 and 14 both increase in value by the same amount and thus the voltage between points 18 and 19 does not change, but if only one of the feeler members is lifted, the capacitances become unequal and the voltage between points 18 and 19 changes.

FIG. 8 shows a special arrangement for detecting splices. Splices extend across the whole width of the web at right angles to the movement of the sheet material. A splice would therefore lift up members 1 and 3 simultaneously and thus would pass undetected. One could of course arrange for at least one of the feeler members 1 to contact the sheet material in a line which is parallel to and a certain distance from the line of contact of contact member 3. A splice would then lift, e.g., feeler member 1 a short time before it would lift contact member 3, thus producing a fault signal.

An alternative method is illustrated in FIG. 8. Feeler member 1 is contacting sheet material 8, which is moving in the direction of the arrow, over supporting roll 9. An auxiliary feeler member 17 is mounted in a fixed relative position to feeler member 1 displaced in the direction of movement of the sheet material and in such a way that it is not contacting the sheet material but is a small distance say four thousandths of an inch above the sheet material. Splices are usually made of much thicker material, e.g., ten thousandths of an inch. If a splice is passing under member 17, this is lifted up together with feeler member 1. Since members 3 are in line with member 1, during the time whilst the splice is moving from member 17 to member 1, a signal is produced.

Figure 10:
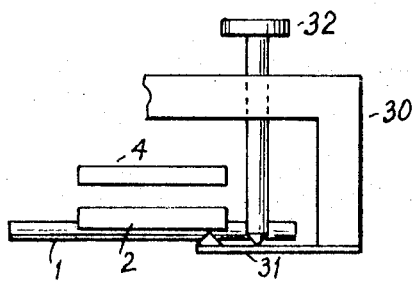
FIG. 10 is a detail of FIG. 9.

Referring now to FIG. 9 of the accompanying drawing, 20 is part of a bracket adjustably mounted on a beam not shown, 2 is a grounded capacitor plate carrying feeler member 1, 29 is a piece of insulating material insulating 1 from 2, 2 being pivoted at points 24 by means of cross strips 21 and 22, 25 is a datum member pivoted at points 28 by means of cross strips 26 and 27, and is carrying contact member 3, capacitor plate 4 being mounted on 25 by means of insulating member 23, 30 is a bracket carrying leaf spring 31 and adjusting screw 32, members 31 and 32 constituting said adjustable means. FIG. 10 shows parts 1, 2, 4, 30, 31 and 32 of FIG. 9 in elevation. Whilst feeler member 1 is a stationary bar in this example, contact member 3 may be a stationary bar or a rotary member.

In operation, contact member 3 is placed on the surface of the sheet material to be inspected, screw 32 is adjusted so that leaf spring 31 lifts feeler member 1 off the surface of the sheet material by a small amount, say .0005". When a gentle wrinkle is passing under the feeler member 1, the wrinkled portion of the paper will contact the feeler member and whilst it may not be able to lift up the feeler member, the contact of the paper, which is a poor insulator, with the insulated feeler member will produce an electrical signal. When a crease or a lump, which is higher than .0005", is passing under the feeler member, it will move the feeler member away from the surface of the paper, thereby the distance between capacitor plates 2 and 4 is decreased and a signal is obtained. If it is not required to detect such gentle wrinkles which are unable to lift member 1, then insulating member 29 may be omitted and feeler member 1 may be mounted directly on grounded member 2. When a lump or crease is passing under contact member 3, the latter member is lifted up together with member 4, bracket 30, leaf spring 31 and members 1 and 2, so that the distance between members 2 and 4 does not change and no signal is obtained. Similarly, if a rotary roll is used as supporting member and the roll runs eccentric or the thickness of the sheet changes, contact member 3 rides on the surface of the paper and carries members 1 and 2 via leaf spring 31 so that the distance between members 2 and 4 remains unchanged. If it is not required to detect inclusions of lumps of insulating material, members 4 and 23 may be omitted. Instead of keeping a small distance, in our example .0005", between the surface of the sheet material and feeler member 1, by a slight adjustment of screw 32 feeler member 1 can be adjusted to contact the surface of the paper. In the latter case there is no point in insulating feeler member 1.

Figure 11:
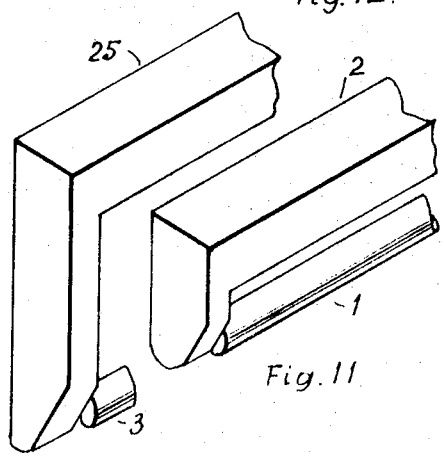
FIG. 11 is a detail of FIG. 9 when a rotating roll is used as feeler member.

FIG. 11 shows detail of modification of the example of FIG. 9 for use with rotating feeler members 1 and 3. Part 2 has been extended and adapted for pivotal mounting of feeler member 1 which is in the form of a roll. Contact member 3 is a short roll of approximately equal diameter to roll 1.

Figure 12:
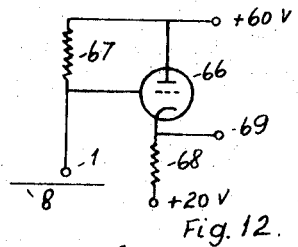
FIG. 12 is a circuit diagram for use in conjunction with an insulated feeler member.

In FIG. 12, 66 is an amplifier tube connected as a cathode follower, 67 is a resistor of high value, e.g., 500 megohms, 68 is the cathode resistor, 69 is the output terminal, 1 is the feeler member, 8 is the paper to be inspected. Should a surface elevation contact feeler member 1, then due to the poor insulating qualities of paper, the grid voltage will become less positive relative to ground and a negative signal output is obtained at terminal 69.

Figure 13:
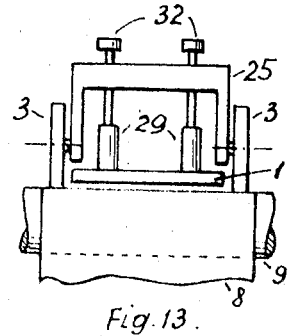
FIG. 13 is another example of probe design with an insulated feeler member.

In FIG. 13, numerals 1, 3, 8, 9, 29 and 32 denote the same parts as in FIG. 9. 25 is the mounting bracket on which the feeler member 1 and contact members 3 are mounted. This probe design is suitable in cases when the method of detecting all surface elevations by utilising the electrical resistance of the sheet material on contact of the surface elevation with the feeler member gives satisfactory results. In operation, contact members 3, which are wheels in this example, are placed on the sheet material 8. The position of insulated feeler member 1 is adjusted by adjusting screws 32 which may have a right hand thread in that portion which engages with part 25 and a left hand thread in that portion which engages with parts 29, in such a way that there is a small gap of say .0005" between the surface of the sheet material and feeler member 1. Bracket 25 being pivotally mounted, contact members 3 maintain contact with the sheet material even if roll 9 runs eccentric or if the thickness of the sheet material changes and therefore the gap between feeler member and the surface of the sheet material remains constant. A surface elevation in excess of .0005" will contact feeler member 1. The circuit of FIG. 12 or any other circuit suitable for detecting the presence of a high electrical resistance may be used. The centre lines of parts 1 and 3 may be in the same vertical plane or alternatively the centre line of contact members 3 may be displaced slightly relative to the centre line of feeler member 1 in the direction of movement of the sheet material. In the latter case a splice would contact feeler member 1 before it would reach and lift contact members 3 and therefore this arrangement is suitable for detection of splices.

FIG. 14 is an example of a circuit diagram of the invention when using a capacitance as reactive circuit element. 64 is an oscillator, 16 is a voltage divider, 17–18–19–20–21–22 form a bridge circuit, 17 is an adjustable resistor, 18 is a fixed resistor, 19 represents the capacitance between capacitor plates 2 and 4 of a probe or of several probes connected electrically in parallel. 20 and 22 are capacitors, 21 is a resistor which may be adjustable or alternatively it may be a fixed resistor the value of which is found by trial and error. The purpose of resistor 21 is to adjust the phase balance of the bridge. 23 is the input tube to an amplifier. 24 is a resistor, 25 is an amplifier, 26 and 30 are diodes, 27, 28, 31 and 32 are resistors, 29 and 33 are capacitors, 34 and 35 are triodes, 36 and 37 are cathode resistors, 38 is a resistor, 39 is a milliammeter, 40 is an anode resistor, 41 is a potentiometer used as an anode resistor, 42 and 43 are triodes, 44, 45, 46, 47 and 48 are resistors, 49 and 50 are capacitors, 51 is a potentiometer, 52 is a variable resistor, 53 is a milliammeter, 54 is a polarised relay, preferably of the moving coil type, and preferably provided with a slave relay, 55 is a normally closed contact operated by relay 54 or its slave relay, 56 is a normally open contact operated by relay 54 or its slave relay, 57 is a pulse generator, 58 is a computer, 59 is a solenoid operating a gate not shown, 60 is the fly knife cylinder of a rotary cutter, 61 and 62 are pulse generating devices driven by 60.

In operation the bridge is adjusted in such a way that the out of balance voltage of the bridge, after amplification, is approximately equal to the voltage taken from potentiometer 16. When this is the case, meter 39 which has a centre zero scale, indicates approximately zero current. When a lump is passing under one of the probes connected to the bridge circuit, the out of balance voltage of the bridge changes for a short time, say 10 milliseconds and a pulse of equal duration is fed from potentiometer 41 to the computer 58. Due to the much longer time constant, say 200 milliseconds, of the RC circuit 44–49 and the even longer time constant of the RC circuit 46–47–48–50, say 400 milliseconds, the amplitudes of the signals reaching tubes 42 and 43 are negligible and no signal reaches relay 54. The sensitivity for lumps can be set by adjusting potentiometer 41. When a crease is passing under one of the probes, the signal is of much longer duration and in practically all cases longer than 200 milliseconds, usually longer than one second. Thus a signal will reach the grids of tubes 42 and 43. It is assumed that resistor 52 was previously adjusted so that in the absence of a signal the current through relay 54 and meter 53 is zero.

At the start of the signal the signal amplitude at the grid of tube 42 is greater than at the grid of tube 43, due to the difference in time constants and relay 54 becomes energised, opening contacts 55 and closing contacts 56. Assuming that in this example 46 is 1 megohm, 47 is 6 kiloohms (resistor 47 may be omitted), 48 is 50 kiloohms and 50 is 8 microfarads, the time constant with contacts 55 closed is approx. 400 milliseconds and with contacts 55 open approx. 8 seconds. Since the operating time of relay 54 is small as compared with 400 milliseconds, a persisting DC signal will cause an out of balance of tubes 42–43 for about 8–10 seconds. When the signal ends, an out of balance of opposite sign may occur for a short time, but since relay 54 is polarised this has the same effect on contacts 55 and 56 as if relay 54 were not energised and therefore contacts 55 close and contacts 56 open. Due to the now short time constant the voltages on the grids of tubes 42 and 43 quickly equalise and the circuit is ready to receive a new signal should one occur. A slow drift of the direct voltage on the cathode of tube 34 does not affect the balance condition of tubes 42–43.

The pulse generating devices 61 and 62 are adapted to provide two pulses each during every full rotation of fly knife cylinder 60 and the pulses are phased in such a way that one pulse occurs immediately before and the second pulse immediately after a future cut line comes in the position half way between two adjoining rods 1 (FIG. 5) the time delay between the two pulses being preset to a small fraction of the total time of a full revolution of fly knife cylinder 60. The pulse generating device 62 is adapted to provide also two pulses during every full rotation of fly knife cylinder 60 and the latter pulses are phased in such a way that one pulse occurs a short time before the leading edge of a cut sheet reaches the gate position and the other pulse occurs a short time before the trailing edge of a cut sheet reaches the gate position. Computer 58 provides the correct time delay to operate gate solenoid 59 just before the leading edge of the sheet containing the fault arrives at the gate.

Figures 15, 16:
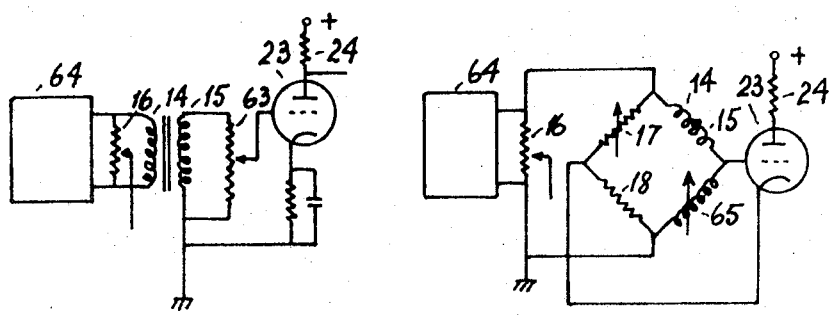
FIG. 15 shows part of a circuit diagram using mutual inductance as the reactive circuit element.
FIG. 16 is part of a circuit diagram using self inductance as the reactive circuit element.

In FIG. 15, numerals 16, 23, 24 and 64 denote identical parts as in FIG. 14. 14 and 15 are coils as indicated in FIG. 4. The rest of the circuit following tube 23 can be identical with the circuit of FIG. 14 following tube 23. In operation, potentiometers 16 and 63 are adjusted so that the voltages across diodes 26 and 30 are equal. This is the case when meter 39 reads zero.

When a lump or crease passes under feeler member 1, the mutual inductance of coils 14–15 is increased, the balanced condition of the tubes 34–35 is disturbed and a signal output is obtained. If several probes are connected to the same tube 23 and the following circuit, the primary coils 14 may be connected in series and similarly the secondary coils 15 may be connected in series.

In FIG. 16, numerals 16, 17, 18, 23, 24 and 64 denote identical parts as in FIG. 14. 14 and 15 are coils as indicated in FIG. 4, but in this example the coils are connected in series. 65 is an inductance forming one arm of the bridge circuit 14–15–17–18–65. 65 may be variable. The circuit following tube 23 is identical with the circuit following tube 23 in FIG. 14.

In operation, 16 and 17 and if variable 65 are adjusted so that the voltages across diodes 26 and 30 are equal. When a lump or crease passes under feeler member 1, the self inductance of coils 14–15 is increased, the balanced condition of the tubes 34–35 is disturbed and a signal output is obtained. If several probes are connected to the same tube 23 and the following circuit, the coils 14–15 of the probes may be connected in series.

It is evident that the more probes are connected to the same amplifier, the less becomes the sensitivity of each probe. If the width of the sheet material is large, it may be necessary to use more than one amplifier, e.g., if 12 probes are required to cover the width of the material, 6 probes may be connected to one amplifier and 6 probes to another, using two complete and separate input circuits, two amplifiers 25 and two balanced circuits containing tubes 34 and 35. The tubes 42 and 43 and the associated circuits do not need to be duplicated, but the cathodes of two tubes 34 in the said two balanced circuits may be connected via diodes in a way well known in the art to the input circuits of one and the same balanced circuit containing tubes 42 and 43.

In case the sheet material is slit lengthwise, i.e., in the direction of movement, into separate flows and it is required to have independent gates for each flow, the complete circuit of FIG. 14 must be repeated for each flow.

Various modifications may be made to the above examples without departing from the invention. For example the tubes in FIG. 14 may be replaced by semiconductor devices if the circuit is modified correspondingly. The relay or relays may be replaced by semiconductor switching devices. The shorter of the two time delay circuits may be omitted. Many other circuit designs will occur to the engineer skilled in the art. Similarly the probe design may be altered without departing from the basic principles of the invention.

What I claim is:

1. Method of detecting surface elevations in moving sheet material in which the sheet material is made to pass over a supporting surface, at least one feeler member is mounted in a movable manner near the area in which the sheet material is in contact with the supporting surface, and is adapted to contact surface elevations in the sheet material as they pass over said area, at least one contact member which is mounted in a movable manner is in contact with the surface of the sheet material, the area of contact between contact member and the sheet material being displaced essentially at right angles to the direction of movement of the sheet material relative to the area in which the feeler member is adapted to contact the surface elevations in the sheet material and electrical means are used to give a signal when a surface elevation in the sheet material is urging the feeler member to move relative to the contact member.

2. Method as claimed in claim 1 consisting further in pivotally mounting the feeler member, mounting the contact member on a datum member which latter is also pivotally mounted and providing adjustable means mounted on the datum member said adjustable means engaging the feeler member said feeler member being biased towards said datum member in such a way that relative movement between contact member and feeler member is mechanically prohibited in one predetermined direction so that when eccentric running or noncircular cross-section of the supporting surface or a change in thickness of the sheet material forces the datum member to move in any direction the feeler member, being engaged by said adjustable means, moves with the contact member so that no signal is produced, but relative movement between datum member and feeler member is unhindered in the opposite direction so that when a local surface elevation which is only present adjacent to the feeler member but not adjacent to the contact member is urging the feeler member to move away from the surface of the sheet material, a change in relative position between feeler member and contact member occurs since the position of the contact member is determined by the contact member remaining in contact with the surface of the sheet material and consequently a signal is produced.

3. Method as claimed in claim 1 consisting further in electrically insulating the feeler member, preventing a direct contact between the surface of the sheet material and the feeler member by mounting the feeler member in such a way that when the contact member is in contact with the surface of the sheet material the feeler member is kept at a small constant distance from the surface of the sheet material, the arrangement being such that when a surface elevation, which is higher than the distance between the surface of the sheet material and the feeler member, is passing under the feeler member, then the surface elevation makes contact with the feeler member thereby changing the electrical resistance between feeler member and contact member and electrical means are used to give a signal when the electrical resistance between the feeler member and the contact member changes.

4. Device for detecting surface elevations in moving sheet material over a supporting surface comprising at least one feeler member which is adapted to be mounted in a movable manner near the area in which the sheet material is in contact with the supporting surface, at least one contact member adapted to be mounted in a movable manner and adapted to contact the surface of the sheet material, said contact member being displaced relative to said feeler member essentially in a direction at right angles to the direction of movement of the sheet material and electrical means adapted to give a signal when a surface elevation in the sheet material is urging the feeler member to move relative to the contact member.

5. Device for detecting surface elevations in moving sheet material over a supporting surface comprising at least one feeler member which is adapted to be mounted in a movable manner near the area in which the sheet material is in contact with the supporting surface, at least one contact member adapted to be mounted in a movable manner and adapted to contact the surface of the sheet material near the feeler member, said contact member being displaced relative to said feeler member essentially in a direction at right angles to the direction of movement of the sheet material, a datum member on which the contact member is mounted, and electrical means adapted to give a signal when a surface elevation in the sheet material is urging the feeler member to move relative to the contact member.

6. Device as claimed in claim 5 in which both the feeler members and the datum member are pivotally mounted.

7. Device as claimed in claim 5 in which both the feeler member and the datum member are pivotally mounted, comprising also adjustable means mounted on the datum member and engaging the feeler member said feeler member being adapted to be biased towards said datum member whereby the relative movement between contact member and feeler member is mechanically prohibited in one predetermined direction but is unhindered in the opposite direction.

8. Device as claimed in claim 5 in which both the feeler member and the datum member are pivotally mounted, comprising also adjustable means mounted on the datum member and engaging the feeler member, said feeler member being adapted to be biased towards said datum member, whereby relative movement between datum member and feeler member is mechanically hindered in one predetermined direction but is unhindered in the opposite direction and said adjustable means are adapted to be adjusted in such a way that movement of the datum member away from the surface of the sheet material would cause the feeler member to move away by an equal amount whereby the relative position of feeler member and datum member does not change but movement of the feeler member away from the surface of the sheet material does not interfere with the position of the datum member which latter position is determined by the contact member remaining in contact with the surface of the sheet material and therefore said movement of the feeler member results in a change in the relative position of the feeler member to the datum member.

9. Device as claimed in claim 5 in which both the feeler member and the datum member are pivotally mounted, comprising also adjustable means mounted on the datum member and engaging the feeler member, said feeler member being adapted to be biased towards said datum member whereby relative movement between datum member and feeler member is mechanically hindered in one predetermined direction but is unhindered in the opposite direction, and said adjusttable means is adapted to be adjusted so that both the contact member and feeler member are in contact with the surface of the sheet material.

10. Device as claimed in claim 5 in which both the feeler member and the datum member are pivotally mounted, comprising also adjustable means mounted on the datum member and engaging the feeler member said feeler member being adapted to be biased towards said datum member whereby relative movement between datum member and feeler member is mechanically hindered in one predetermined direction but is unhindered in the opposite direction and said adjustable means is adapted to be adjusted so that the feeler member is located at a small distance from the surface of the sheet material.

11. Device as claimed in claim 5 in which said electrical means comprises a capacitor of which one capacitance plate is mounted on the feeler member and the other capacitance plate is mounted on the datum member, said electrical means being adapted to give a continuous signal whilst the relative position between feeler member and datum member differs by more than a predetermined amount from a predetermined relative position.

12. Device as claimed in claim 5 in which said electrical means comprises an open magnetic core mounted on the datum member and at least one coil wound on said core and a yoke member mounted on the feeler member, said electrical means being adapted to give a continuous signal whilst the relative position between feeler member and datum member differs by more than a predetermined amount from a predetermined relative position.

13. Device as claimed in claim 4 comprising also an auxiliary feeler member and means to connect said auxiliary feeler member in a rigid and unyielding position relative to said feeler member in a manner that said two feeler members are displaced relative to each other in the direction of movement of the sheet material.

14. Device for detecting surface elevations in moving sheet material over a supporting surface comprising at least one feeler member which is adapted to be mounted in a movable manner near the area in which the sheet material is in contact with the supporting surface, at least one contact member adapted to be mounted in a movable manner and adapted to contact the surface of the sheet material, said contact member being displaced relative to said feeler member essentially in a direction at right angles to the direction of movement of the sheet material and electrical means adapted to give a signal when a surface elevation in the sheet material is urging the feeler member to move relative to the contact member, comprising also an amplifier, connecting means to connect the output of said electrical means to said amplifier, rectifying means to rectify the output of said amplifier giving at least one DC output, a balanced circuit having two inputs, at least one time delay means connected to one of said two inputs, switching means to shorten the time constant of said time delay means, said switching means being inoperative whilst the said inputs are unequal by more than a predetermined amount in a predetermined direction and means to give a continuous AC or DC signal whilst the said two inputs are unequal by more than a predetermined amount in a predetermined direction.

References Cited

UNITED STATES PATENTS

| | | | |
|---|---|---|---|
| 883,831 | 4/1908 | Robertson et al. | 340—249UX |
| 1,012,379 | 12/1911 | Longden | 33—147X |
| 2,146,442 | 2/1939 | Price | 340—265UX |
| 2,224,728 | 12/1940 | Gulliksen | 33—147UX |
| 2,503,720 | 4/1950 | Gieseke | 33—147UX |
| 2,942,248 | 6/1960 | Huggins | 340—259 |

JOHN W. CALDWELL, Primary Examiner

D. L. TRAFTON, Assistant Examiner

U.S. Cl. X.R.

33—147; 73—37.7, 159; 200—61.13; 340—265